(12) United States Patent
Inoue et al.

(10) Patent No.: US 6,263,165 B1
(45) Date of Patent: *Jul. 17, 2001

(54) DEVICE AND METHOD FOR DETECTING A REST POSITION OF A REVOLVING BODY, AND AN APPARATUS EQUIPPED WITH SUCH A DEVICE

(75) Inventors: Yoshiyuki Inoue, Izumi; Yoshiharu Tanaka; Ryuichi Yasuhara, both of Sakai; Akira Ogino, Osaka, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,694

(22) Filed: Jan. 27, 1997

(30) Foreign Application Priority Data

Jan. 29, 1996 (JP) ...................................................... 8-012460

(51) Int. Cl.[7] .............................. G03B 7/24; G03B 17/26
(52) U.S. Cl. ............................................ 396/207; 396/515
(58) Field of Search ..................................... 396/207, 515, 396/208, 511

(56) References Cited

U.S. PATENT DOCUMENTS

| | | | |
|---|---|---|---|
| 5,278,600 | 1/1994 | Takahashi et al. | 354/275 |
| 5,321,455 | 6/1994 | Cocca | 354/207 |
| 5,347,334 | 9/1994 | Smart et al. | 354/275 |
| 5,349,401 * | 9/1994 | Bryant | 396/207 |
| 5,394,206 * | 2/1995 | Cocca | 396/207 |
| 5,541,681 * | 7/1996 | Cocca et al. | 396/207 |
| 6,026,248 * | 2/2000 | Shikaumi et al. | 396/207 |

* cited by examiner

Primary Examiner—Christopher E. Mahoney
(74) Attorney, Agent, or Firm—McDermott, Will & Emery

(57) ABSTRACT

In a cartridge chamber of a camera is disposed a photoreflector to read a bar code formed on a disk attached to an end of a film spool. When a cartridge is loaded, the film spool is rotated more than one round in the direction to rewind the film. The photoreflector starts to read the bar code when supply of a driving force to rotate the spool is started. The leading part and the trailing part of the output signals of the photoreflector are compared in the reverse direction to find a point where signals corresponding to the constant rotation of the disk begin. The signals preceding the point are discarded and the initial position of the disk before it is rotated is determined based on the length of the signals truly representative of the bar code while the disk is rotating at the constant speed. Use condition of the film, unexposed, fully exposed, partly exposed or already developed, is judged from the initial position of the disk.

18 Claims, 14 Drawing Sheets

DEVICE AND METHOD FOR DETECTING A REST POSITION OF A REVOLVING BODY, AND AN APPARATUS EQUIPPED WITH SUCH A DEVICE

BACKGROUND OF THE INVENTION

1. Field of the Invention

The present invention relates to a device and a method for detecting a rest position of a revolving body bearing a two-level code such as a bar code, and more particularly, to a detector for detecting a stopped position of a bar code disk in an apparatus such as a camera, a film scanner or the like using a film cartridge having a bar code disk on its spool.

2. Description of the Prior Art

In recent years, various new photographic systems suitable for automatic cameras have been proposed. Some of the new photographic systems use new types of film cartridges which are different from conventional film cartridges.

Some of the proposed film cartridges have a disk (rotation body) which rotates integrally with a film take-up spool and is provided with a bar code representing attributes of the film. The use condition of the film, i.e. whether the film is unexposed, fully exposed, partly exposed, or developed can be known from the stopped position of the bar code on the disk.

It is necessary to provide cameras, laboratory apparatuses and reproducing apparatuses such as film scanners which deal with film cartridges of the above-described type with a detector for accurately determining the position of the bar code. Since accuracy of the determination depends on the set location of the detector and the determination process, it is necessary to set the detector at a proper location and to use a complicated determination process so that the determination is made more accurately. A location and a process that enable accurate determination of the stopped position of the bar code are required especially for popular cameras where the detector cannot be located very precisely.

SUMMARY OF THE INVENTION

An object of the present invention is to provide an arrangement and a method capable of accurately reading bar code information recorded on a film cartridge. A further object of the present invention is to provide an arrangement and a method capable of accurately reading bar code information recorded on a film cartridge even if there is a certain mechanical or operational error.

To achieve the above-mentioned object, according to one aspect of the present invention, a device for handling a mechanism provided with a rotary shaft and a rotary plate rotating together with the rotary shaft and having a surface including a first section where a bar code comprising a first state and a second state is formed and a second section which is of the first state and adjacent to the first section comprises: a drive shaft detachably joined to the rotary shaft for driving the rotary shaft to rotate; a monitor disposed opposite the surface of the rotary plate for monitoring the state of the surface of the rotary plate; a memory for storing signals outputted by the monitor after the drive shaft starts rotating; and a detector for detecting an initial rest position of the rotary plate based on the signals stored in the memory.

Here, the detector recognizes as a first region a group of signals obtained after the drive shaft starts rotating until a result of monitoring by the monitor come to remain in a constant state for a period longer than a predetermined period. The detector also recognizes as a second region a group of signals obtained after the constant state starts until a result of monitoring by the monitor come to remain in a constant state again for a period longer than the predetermined period.

The groups of signals of the first and second regions are compared from latest signals and a point where a difference occurs between the signals of the two regions is found. The signals of the first region preceding the found point are discarded, since false information such as noise is included. The initial rest position of the rotary plate is determined based on the true signals thus obtained.

The first and the second states of the surface of the rotary plate may be realized as a difference in reflective index for light, in conductivity for electricity or in physical height. Appropriate detectors, for example, a photoreflector for the first case, are employed to detect the states.

When the device or the method described above are applied to a camera which utilizes a film cartridge containing a film spool having a disk on which a bar code representative of the attributes of the film is provided, the rest position of the disk, i.e. the initial position when the cartridge is loaded in the cartridge chamber can be detected accurately. Therefore, not only the bar code information is read correctly but also the use condition of the film is known unambiguously.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
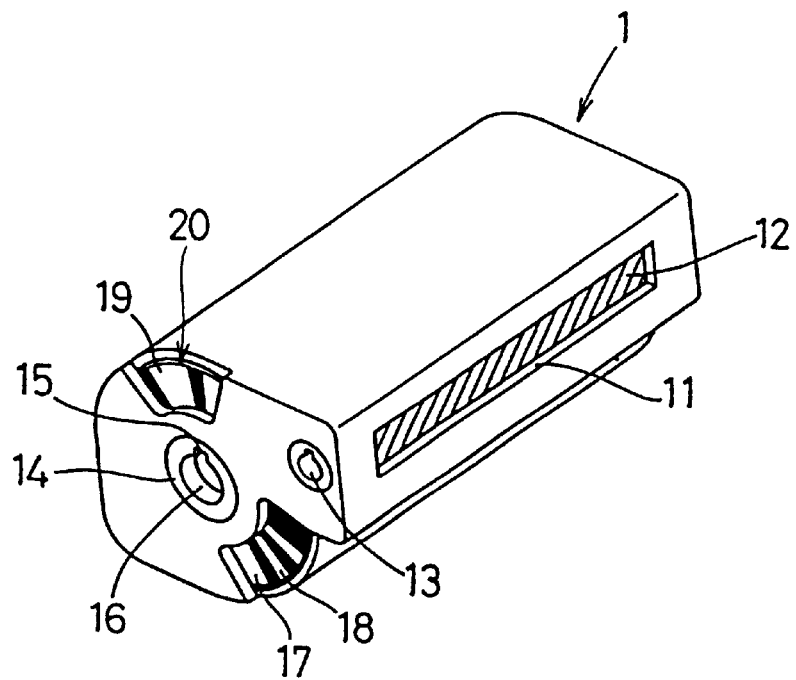
FIG. 1 is an external view of a film cartridge used in an embodiment of the present invention.

An embodiment of the present invention will be described. FIG. 1 is an external view of a film cartridge 1 used in this embodiment. A light intercepting door 12 is provided at a film take-out slot 11. The photographic film (not shown) is wholly housed in the film cartridge 1 when the film is unused as well as after photographing is finished. When the film cartridge 1 is not loaded in a camera, the light intercepting door 12 is locked being closed. The locking and unlocking of the light intercepting door 12 is made by the camera through a door lock hole 13 formed in an end surface of the film cartridge 1.

A spool 14 on which the film is wound is also locked with its rotation inhibited when the film cartridge 1 is not loaded in the camera. At an end of the spool 14, a hole 16 having a key groove 15 is formed. The spool 14 is rotated by a driving force supplied from outside the film cartridge 1. Although not shown, another hole is formed at the other end of the spool 14 so that the spool 14 rotates while being supported by the camera at the holes at the both ends.

At an end of the spool 14, a rotary plate 20 that rotates together with the spool 14 is disposed, and, on the surface of the rotary plate 20, a bar code 17 is formed which is representative of attributes of the film. In an end surface of the film cartridge 1, windows 18 and 19 are formed for reading the bar code 17 therethrough. The bar code 17 comprises a black and white pattern radiating from the axis of rotation of the spool 14. The black and white areas of the pattern are divided into two types: one having a wide central angle and one having a narrow central angle. The attributes of the film represented by the bar code 17 include the ISO speed, the latitude, whether the film is positive or negative and the number of frames to be recorded. When the film cartridge 1 is loaded in the camera, the spool 14 is rotated in a direction to rewind the film and the information represented by the bar code 17 is read.

Figure 2:
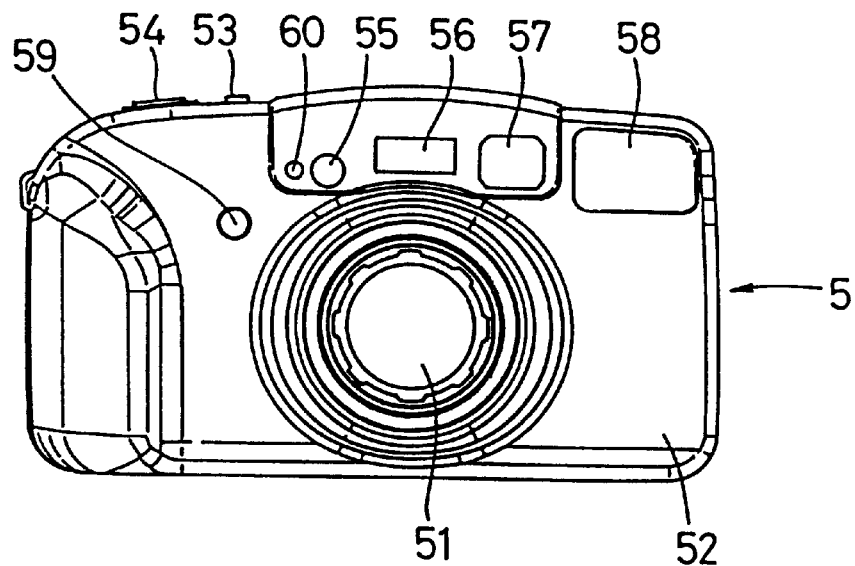
FIG. 2 is a front view of a camera according to the embodiment.
Figure 3:
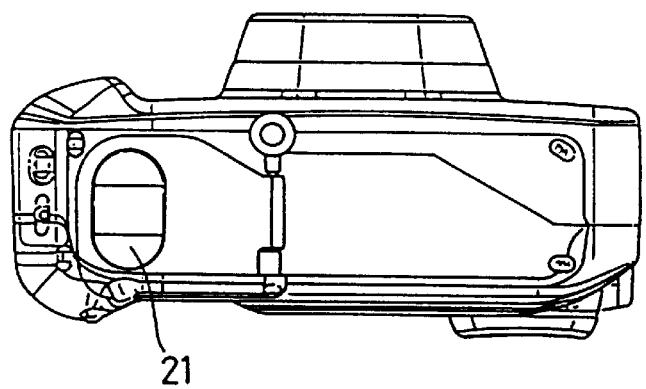
FIG. 3 is a bottom view of the camera according to the embodiment.

FIGS. 2 and 3 are a front view and a bottom view of a camera according to this embodiment. The camera is an autofocus camera of lens shutter type. A taking lens 51 comprising a zoom lens is mounted on the front surface of a camera body 52. The lens barrel of the taking lens 51 has a three-segment moving-out structure. When not in use, most part of the taking lens 51 is housed in the body 52. In FIGS. 2 and 3, the taking lens 51 is housed in the body 52. Within the taking lens 51 is provided a shutter which also serves as the aperture.

On the top surface of the body 52, a main switch 53 and a shutter release button 54 are disposed. By operating the main switch 53, power supply is started to move out the lens barrel of the taking lens 51. When the release button 54 is half pressed, a distance measuring device is activated. When the release button 54 is fully pressed, the autofocus mechanism is started, and then the shutter is released so that the film is exposed to take a picture. In an upper part of the front surface of the body 52 are provided a photometric window 55 for exposure control, a distance measurement window 56 for focusing, an objective window 57 for a finder optical system, and a light projecting window for an electronic flash 58 for illuminating the subject.

The camera is capable of performing remote-controlled photography by receiving a radio signal from a non-illustrated remote control device and is capable of performing self-timer photography. A remote control receiver 59 and a remote control indicator 60 are provided on the front surface of the body 52. The remote control indicator 60 is also used as a self-timer indicator. On the non-illustrated rear surface of the body 52 are provided a liquid crystal display for displaying film information and warning, and a partway rewinding switch for forcedly rewinding the film before all the frames are exposed.

Figure 4:
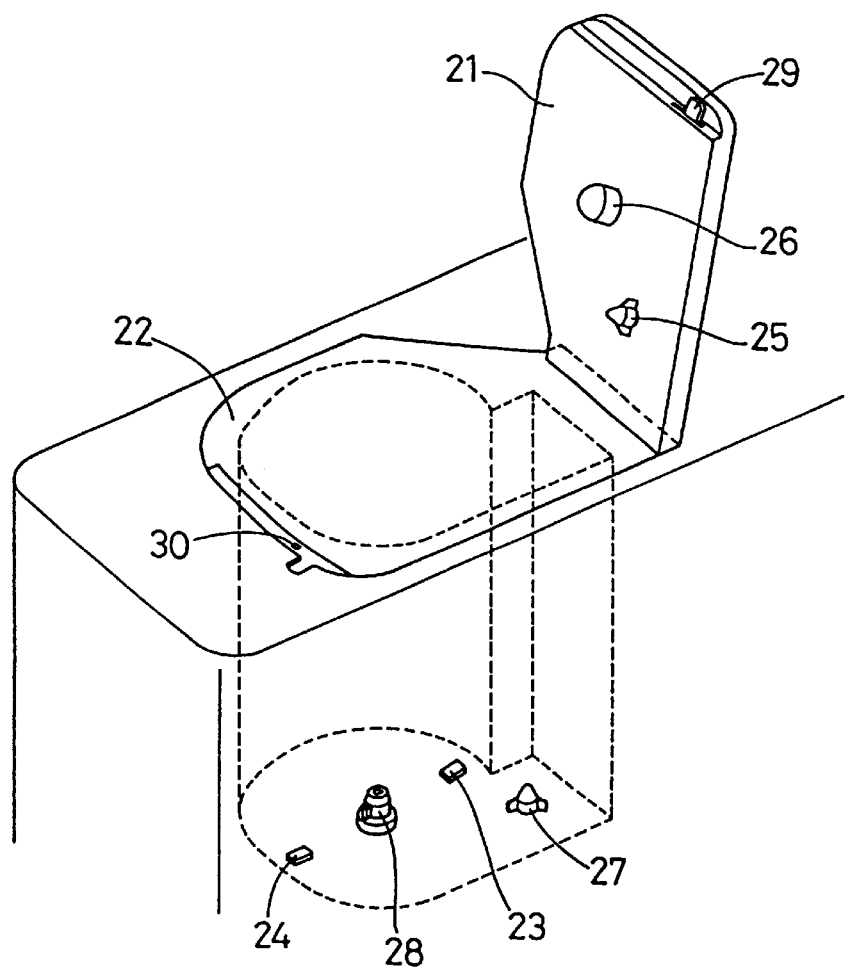
FIG. 4 is a perspective view showing a schematic structure of a film cartridge chamber.

The camera is designed so that a lid 21 provided on the bottom surface is opened to load the film cartridge 1 into a cartridge chamber. A schematic structure of the cartridge chamber 22 is shown in the perspective view of FIG. 4.

At the bottom of the cartridge chamber 22, photoreflectors 23 and 24 each comprising a light emitting device and a light receiving device are provided in positions to be located opposite the windows 18 and 19 of the film cartridge 1. The light emitting device emits light to the bar code and the light receiving device detects the reflected light to detect a binary value corresponding to black and white, so that the bar code information is outputted as a binary signal consisting of a high level (hereinafter, referred to as H level) and a low level (hereinafter, referred to as L level). It is not always necessary to provide two photoreflectors. In this embodiment, however, two photoreflectors are disposed 190 degrees apart from each other in order to efficiently read the bar code. Hereinafter, the photoreflectors 23 and 24 will be referred to as a first sensor and a second sensor, respectively.

The bottom lid 21 has a lock lever 29. The camera body 52 has a bottom lid lock switch 30 for detecting that the lock lever 29 is set in a lock position. On the inner surface of the bottom lid 21 are provided a protrusion 25 for opening and closing the light intercepting door 12 and a protrusion 26 to be inserted in the hole formed at the end of the spool 14 to support the spool 14. At the bottom of the film cartridge chamber 22 are provided a protrusion 27 to be inserted in the door lock hole 13 to unlock the light intercepting door 12 and a driver 28 included in a mechanism for rotating the spool 14 and to be inserted in the hole 16 having the key groove 15.

When the film cartridge 1 is loaded in the film cartridge chamber 22 and the bottom lid 21 is closed, the protrusion 27 is inserted in the door lock hole 13 to unlock the light intercepting door 12 and the door 12 is opened by the protrusion 25. The spool 14 is supported at its both ends by the driver 28 inserted in the hole 16 and the protrusion 26 inserted in the other hole.

Figure 5:
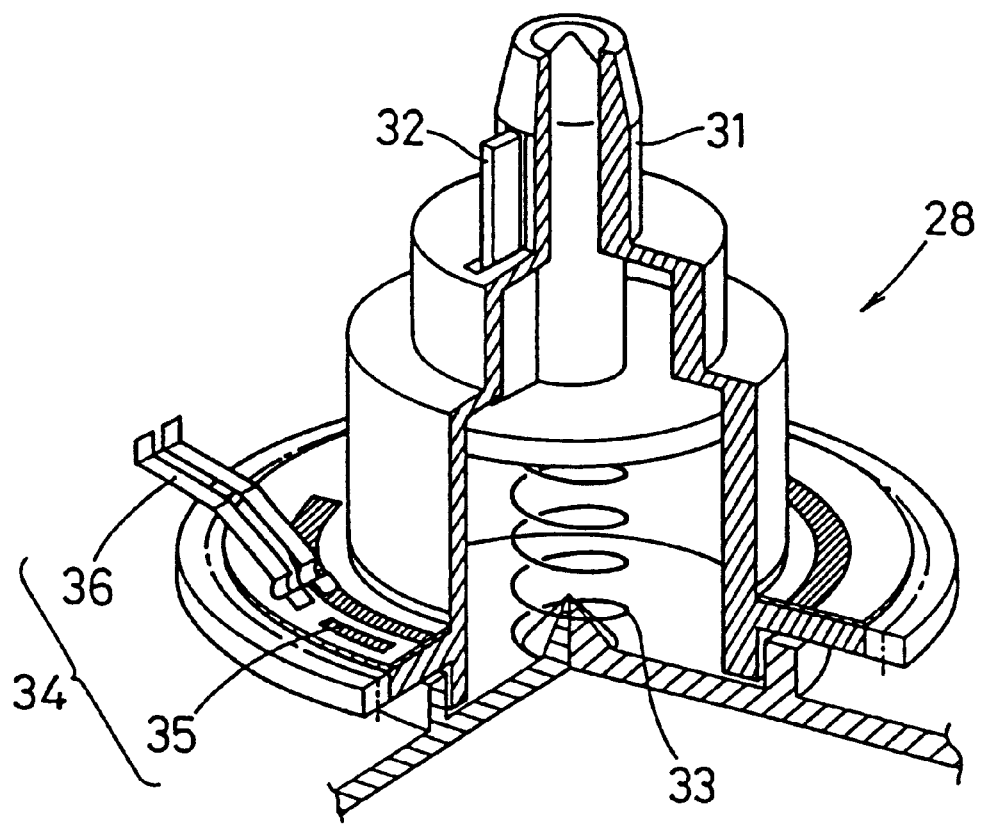
FIG. 5 shows a structure of a driver for driving the film cartridge.

Referring to FIG. 5, there is shown a structure of the driver 28. The driver 28 is rotated clockwise and counterclockwise by a driving force from a motor outside the figure. The driver 28 has a dual structure of inner and outer parts. An upper end 31 of the outer part is of a cylindrical form having an outside diameter slightly smaller than the inside diameter of the hole 16 of the spool 14. When the film cartridge 1 is loaded in the film cartridge chamber 22, the upper end 31 is inserted in the hole 16. The inner part has a key 32 and is pushed upward by a spring 33.

When the direction of the key 32 does not agree with the direction of the key groove 15, the inner part is pushed down so that it does not engage with the spool 14. When the driver 28 is rotated under this condition, the rotation is not transmitted to the spool 14. When the direction of the key 32 agrees with the direction of the key groove 15, the key 32 is inserted into the key groove 15 by being pushed by the spring 33, so that the driver 28 engages with the spool 14 to transmit the rotation of the driver 28 to the spool 14.

On the outer part, a pattern 35 of an encoder 34 is formed and a switch 36 in contact therewith detects the direction of the driver 28. The direction detected by the encoder 34 is used for deciding in which direction the spool 14 is stopped when the film is rewound. The detected direction is also used for deciding the rotation amount of the motor.

Figure 6:
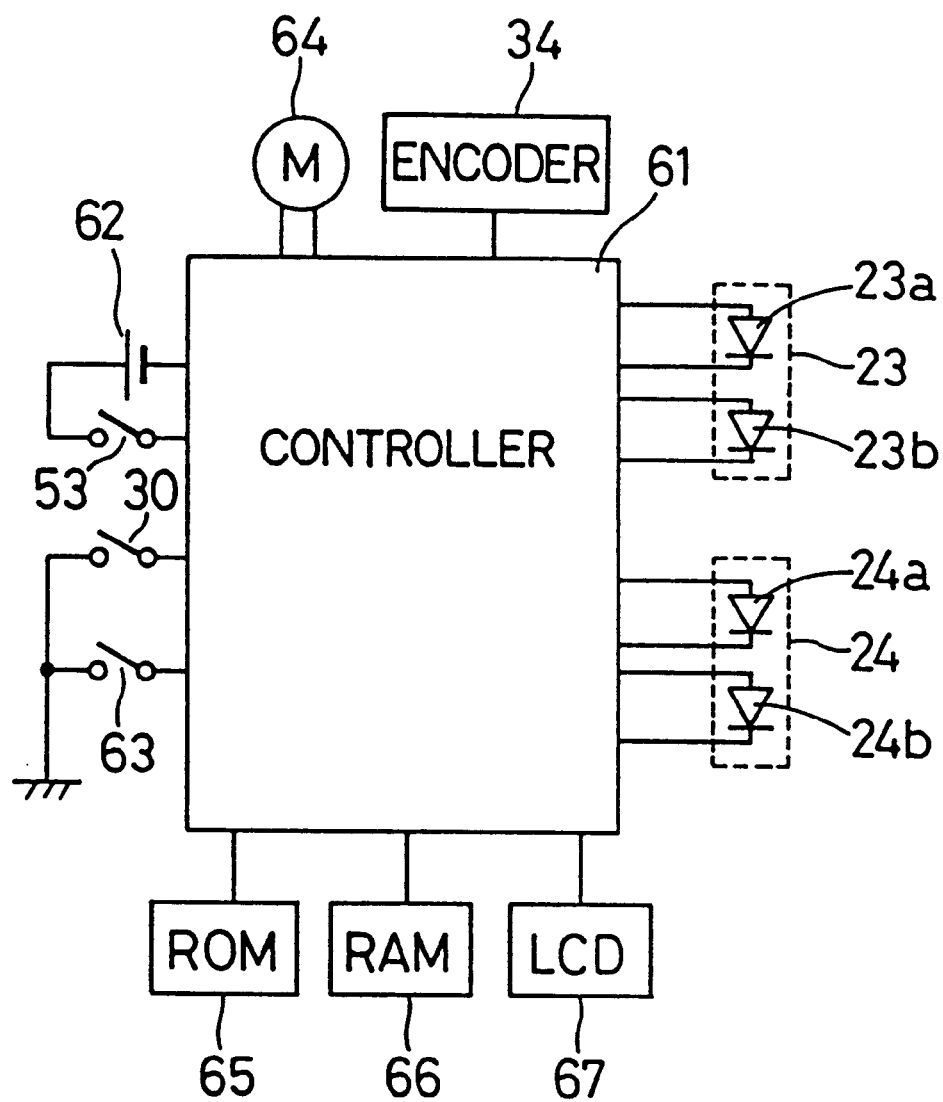
FIG. 6 shows an arrangement associated with a film control operation performed by the camera.

FIG. 6 is a block diagram showing an arrangement associated with a film control operation performed by the camera. To a controller 61 comprising a microcomputer are connected a power supply battery 62, the main switch 53, the bottom lid lock switch 30, a partway rewinding switch 63, the two photoreflectors 23 (first sensor) and 24 (second sensor), a motor 64, the encoder 34, a read only memory (ROM) 65, a random access memory (RAM) 66 and a liquid crystal display 67. The photoreflector 23 comprises a light emitting diode 23a serving as the light emitting device and a photodiode 23b serving as the light receiving device. Likewise, the photoreflector 24 comprises a light emitting diode 24a and a photodiode 24b.

The motor 64 rotates the driver 28 shown in FIG. 5. The encoder 34 detects the direction of the driver 28. The rotation amount of the motor 64 is detected based on the output of the encoder 34. The ROM 65 stores control programs and parameters. The RAM 66 temporarily stores output signals of the photoreflectors 23 and 24.

The use condition of the photographic film includes the following four: unexposed condition, partly exposed condition, fully exposed condition and developed condition. The use condition is indicated by the direction of the spool 14, i.e. the stopped position of the bar code 17. By reading the bar code 17 with the first and the second sensors when the film cartridge 1 is loaded in the camera, the direction of the spool 14 is detected to determine the use condition of the film.

When the film is unexposed, the spool 14 is rotated to advance the film so that the first frame is ready for photographing. When the film is fully exposed or developed, the film is not advanced and, for example, a warning is provided to the user or the film cartridge 1 is automatically discharged. Double exposure is prevented by such safety measures. Partly exposed films may be handled in the same manner as fully exposed films or may be advanced to the first frame of the unexposed frames.

After exposure of all frames is finished, the film is rewound, the bar code 17 is stopped at a predetermined position indicating that the film is fully exposed, and the spool 14 is locked. When an unexposed film is rewound without being exposed, the bar code 17 is stopped at a position indicating that the film is unexposed, and the spool 14 is locked. When the film is rewound after only some of the frames are exposed, the bar code 17 is stopped at a position indicating that the film is partly exposed and the spool 14 is locked. Normally, the setting of the bar code 17 in a position indicating that the film is developed is made in the development processing and is not made by the camera for photographing. When a developed film is loaded, the bar code 17 is set in the position indicating that the film is developed in order that the bar code 17 continuously indicates the developed condition.

Figure 7:
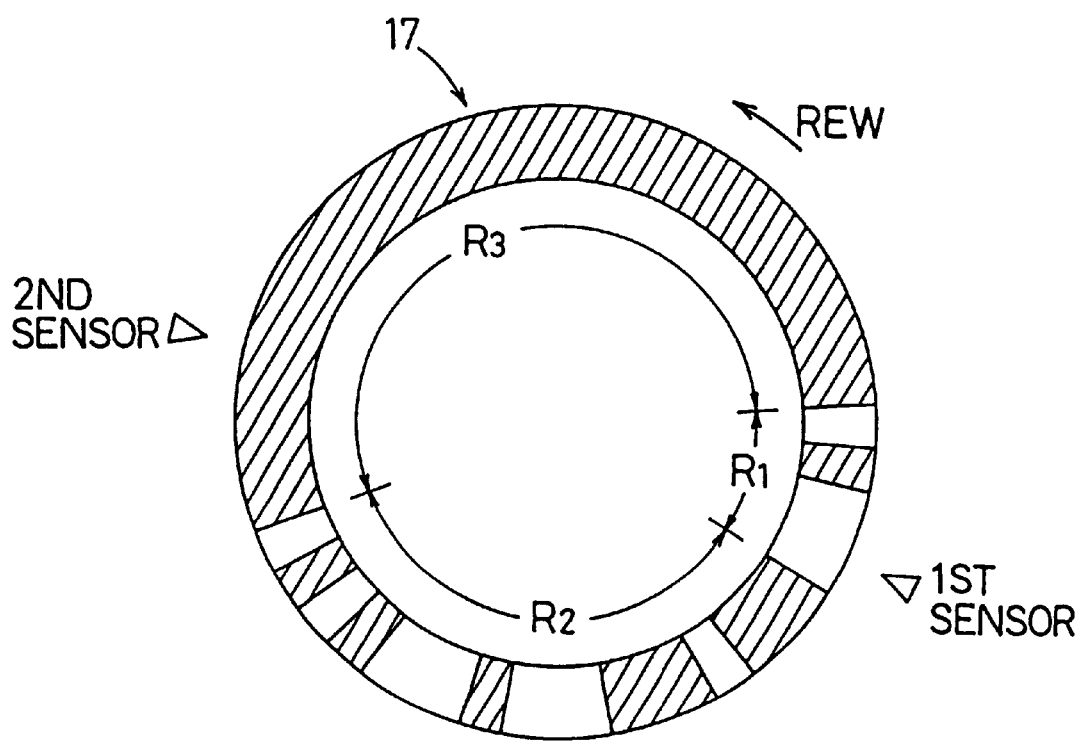
FIG. 7 shows an example of a bar code and a positional relationship between two photoreflectors for reading the bar code.

FIG. 7 shows an example of the bar code 17 and a positional relationship between the first and second sensors. An arrow REW shows the direction in which the film is rewound. The bar code 17 includes a first zone R1 representing the total number of frames of the film, a second zone R2 representing the ISO speed, the latitude and whether the film is positive or negative, and a third zone R3 representing no information (i.e. having a uniform state). Each zone has a predetermined size (angle). The first zone R1 includes one wide area and two narrow areas, and a white area, a black area and white area appear in the film rewinding direction. FIG. 7 shows an example where a narrow area, a narrow area and a wide area appear in this order.

The second zone R2 includes two wide white areas, two wide black areas, three narrow white areas and three narrow black areas. The area R2 starts with a black area in the film rewinding direction, followed by alternately appearing white and black areas, and ends with a white area. The arrangement of the wide and narrow areas varies according to the contents of the information. The zone R3 is entirely black. For the size of each zone and area, certain errors are allowed in anticipation of errors caused during manufacture.

As mentioned previously, the first and the second sensors are set in positions such that the central angle from the first sensor to the second sensor along the arrow REW is 190 degrees. Consequently, the bar code 17, when rotated in direction of arrow REW, is first read by the first sensor and then rotated substantially 190 degrees to be read by the second sensor.

Figure 8:
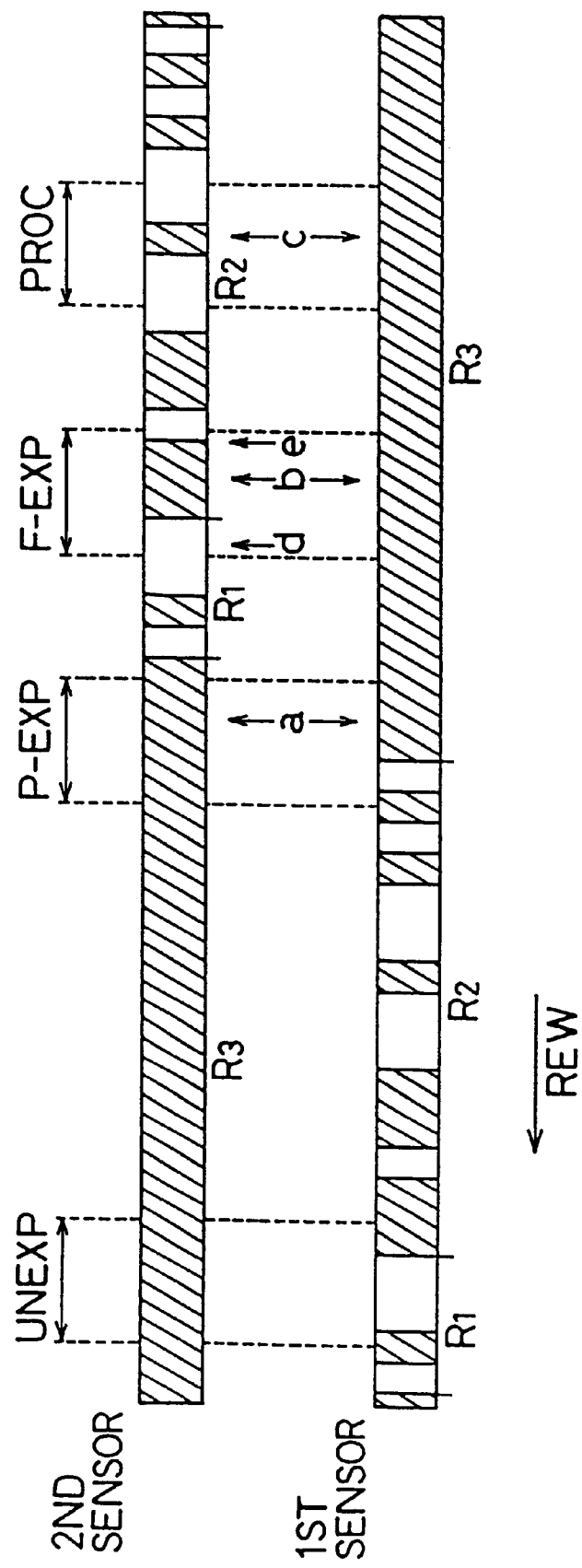
FIG. 8 shows a relationship between the use condition of the film and the bar code stopped position.

Referring to FIG. 8, there is shown a relationship between the use condition of the film and the stopped position of the bar code 17. In this figure, the bar code 17 is linearly developed although it is actually of a circular form with areas radiating from the spool 14. FIG. 8 corresponds to the bar code and the positional relationship of the first and second sensors shown in FIG. 7, so that the upper pattern, which is read by the second sensor, is shifted by 190 degrees from the lower pattern, which is read by the first sensor.

The range designated UNEXP is a permissible range of the bar code stopped position for unexposed films. That is, it is shown that when the film cartridge 1 is loaded in the camera, the film is determined to be unexposed if the rear two-thirds of the first zone R1 or the front part of the second zone R2 is located opposite the first sensor and the third zone R3 is located opposite the second sensor. Likewise, the ranges designated P-EXP, F-EXP and PROC are permissible ranges of the bar code stopped positions for partly exposed films, fully exposed films and developed (processed) films, respectively.

The binary value representative of black and white of the bar code 17 whose stopped positions are predetermined as described above is not read when the bar code 17 is stopped. This is because there are a plurality of stopped positions where the black/white combination of the areas located opposite the first and the second sensors are the same, and the position where the bar code 17 is stopped cannot be specified. For example, in FIG. 8, the binary values read by the first and the second sensors at a point a included in the range P-EXP, at a point b included in the range F-EXP and at a point c included in the range PROC are the same. This means that, when the bar code 17 is at rest, it is not possible to determine whether the film is partly exposed, fully exposed or developed.

The position where the bar code 17 was stopped can be determined by detecting the binary value of the bar code 17 with the first and the second sensors while rotating the spool 14 in the film rewinding direction and analyzing the variation in the detected levels. For example, the second sensor outputs different signals between when the bar code 17 is rotated from the point a and when it is rotated from the point b. When the bar code 17 is rotated from the point a in the direction of the arrow REW, the level of the output signal varies between the L and H levels fourteen times and is then maintained low for a period corresponding to the third zone R3. When the bar code 17 is rotated from the point b in the same direction, the level of the output signal varies between the L and H levels ten times and is then maintained low for the period corresponding to the third zone R3. Based on the difference between these signals, the bar code stopped position is distinguished between the points a and b. The distinction of the stopped position between the points b and c is made in a similar manner.

The variation of output signal of the first sensor is the same whether the bar code stopped position is the point a, b or c. The level variation of output signal of the first sensor is useful for distinguishing the range UNEXP from other ranges. By considering both the output signal of the first sensor and the output signal of the second sensor, the four stopped positions of the bar code 17 are distinguished, so that the four use conditions of the film are discriminated.

However, although this method is simple and correctly functions in theory, the stopped position of the bar code 17 cannot always be determined correctly. This is because a false level variation is detected until the rotation of the bar code 17 is stabilized. Since the spool 14 is loose, in a case where the bar code 17 is stopped when the vicinity of the borderline between a white area and a black area is located opposite the first or the second sensor, the spool 14 slightly shakes after the light intercepting door 12 is unlocked, so that the output level of the sensor varies a number of times. For example, when four false level variations are caused at the point b included in the range F-EXP, the bar code 17 is falsely determined to have been stopped in the range P-EXP. Furthermore, noise may also result from slight movement of the key 32 due to friction that is caused before the key 32 is engaged with the key groove 15 or due to a shock that is caused when the key 32 is engaged.

Such an erroneous determination may be made even if the shake of the spool 14 is sufficiently prevented. When the borderline between a white area and a black area is located opposite the first or the second sensor, the light from the light emitting device of the sensor is irradiated both to the white area and to the black area, so that the reflected light is halved. Consequently, the output level of the sensor becomes intermediate between the H and L levels representative of the binary value. As a result, the output level cannot correctly be determined.

Although the probability that this will take place is low, the determination of the bar code stopped position based on the number of level variations is not always sufficiently reliable.

The position where the bar code 17 was stopped can be determined by counting the time elapsed from the start of the motor 64 to the output of a signal of the L level corresponding to the third zone R3. However, this is not a perfect method, either. As described above, the spool 14 does not stably rotate until its key groove 15 engages with the key 32 of the driver 28. The time elapsed before the key 32 engages with the key groove 15 differs according to the directions of the spool 14 and the driver 28 when the film cartridge 1 is loaded, and the time elapsed from the start of the motor 64 to the start of rotation of the spool 14 is not fixed. For this reason, the determination of the bar code stopped position is unreliable according to the time elapsed before a signal of the L level corresponding to the third zone R3 is outputted.

The above-described problem is ascribed to the fact that the bar code 17 is provided for indicating attributes such as the film speed and the number of frames to be recorded and does not bear any information on its position. Therefore, a subsequently-described control operation is performed in this embodiment.

Figure 9:
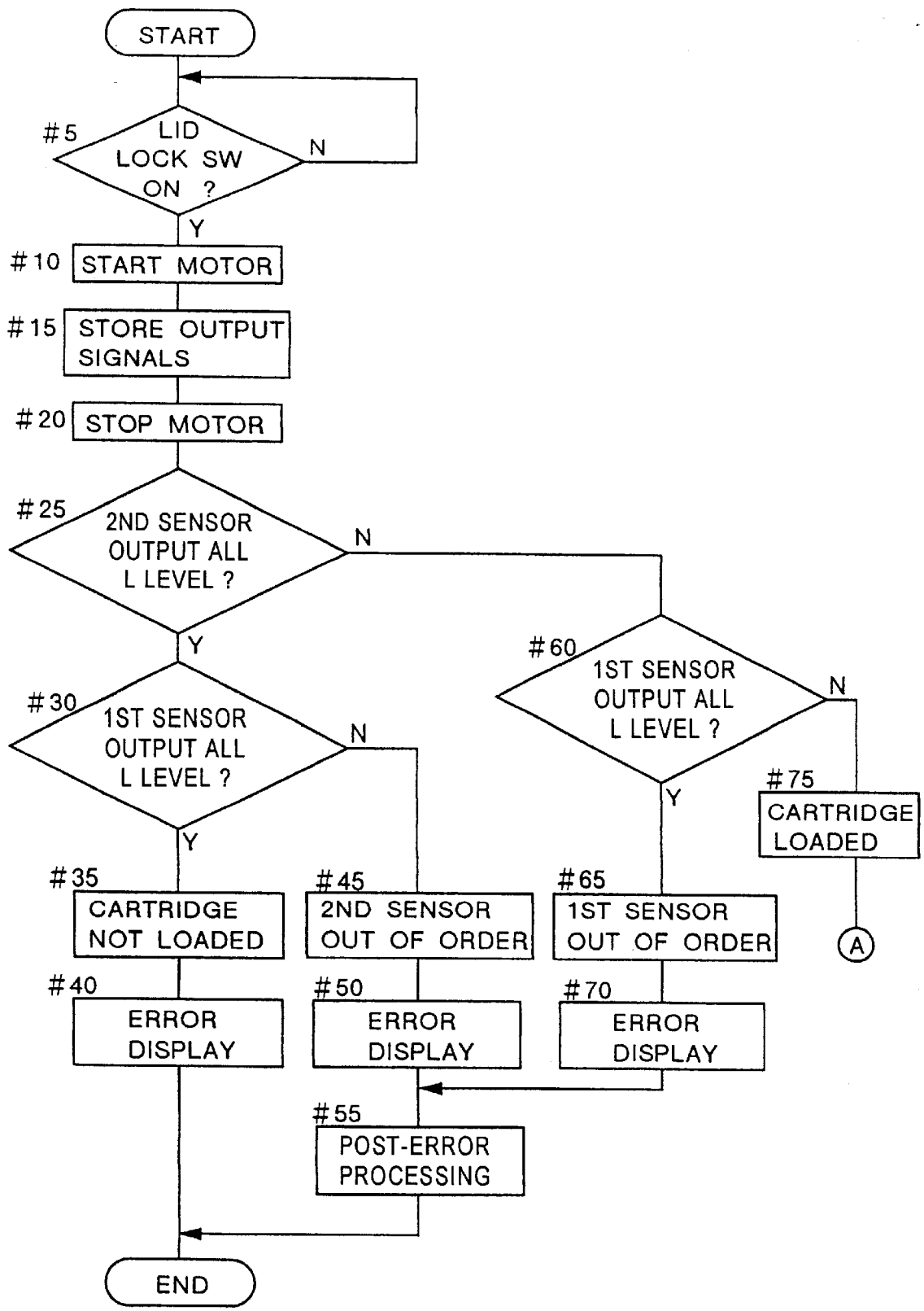
FIG. 9 is a flowchart of a processing to determine whether the film cartridge is loaded or not and whether the photoreflectors are out of order or not.

A control operation performed when the film cartridge 1 is loaded in the camera will be described with reference to the flowchart of FIG. 9 which shows a routine to determine whether the film cartridge 1 is loaded or not and whether the photo-reflectors are out of order or not. When the bottom lid 21 is opened and closed again to turn on the bottom lid lock switch 30 (step #5), the motor 64 is rotated in the film rewinding direction (step #10). The reading of the bar code 17 by the first and second sensors is started concurrently with the start of the motor 64, and the output signals of the sensors are stored in the RAM 66 (step #15).

The driving of the motor 64 and the storage of outputs of the first and second sensors are continued until an L-level signal of the third zone R3 appears in the output signal of the second sensor after the last H-level signal of the second zone R2 appears twice or until the driver 28 has made two rotations before an H-level signal appears in the output signal of the second sensor (#20). When the film cartridge 1 is loaded, the key 32 of the driver 28 engages with the key groove 15 of the spool 14 while the driver 28 is making one rotation and thereafter, the bar code 17 surely makes one or more rotations, so that the first and the second sensors output H-level signals.

Then, whether the stored output signals of the second sensor are all L-level signals or not is determined (#25). When all are L-level signals, whether the stored output signals of the first sensor are all L-level signals or not is determined (#30). When all the output signals of the first sensor are L-level signals, since neither of the sensors could read the bar code 17, it is determined that the film cartridge 1 is not loaded (#35), and after the liquid crystal display 67 provides an error display indicating this (#40), the routine is ended.

When it is determined at step #30 that the output signals of the first sensor are not all L-level signals, this indicates that the second sensor could not read the bar code 17 although the film cartridge 1 is loaded. When this happens, the second sensor is determined to be out of order (#45) and an error display indicating this is provided (#50). Then, after a post-error processing is performed to set the bar code 17 in a position indicating that the film is fully exposed (#55), the routine is ended.

When it is determined at step #25 that the output signals of the second sensor are not all L-level signals, whether the stored output signals of the first sensor are all L-level signals or not is determined (#60). When all are L-level signals, since this indicates that the first sensor could not read the bar code 17 although the film cartridge 1 is loaded, the first sensor is determined to be out of order (#65) and an error display indicating this is provided (#70). Then, after the bar code 17 is set in the position indicating that the film is fully exposed as described above (#55), the routine is ended.

When the output signals of the first sensor are not all L-level signals at step #60, it is determined that the film cartridge 1 has been loaded (#75) and the first and second sensors are both in order. This also indicates that the second sensor has detected the last H-level signal of the second zone R2 twice while reading the bar code 17 at step #15. In this case, the process proceeds to step #105 of FIG. 10 or to step #205 of FIG. 11.

The reason why the bar code 17 is set in the position indicating that the film is fully exposed in the post-error processing of step #55 is that this ensures prevention of double exposure. If the film cartridge 1 is taken out of the camera with the motor 64 having been stopped at step #20, it is quite likely that the bar code 17 indicates a condition other than the unexposed, the partly exposed, the fully exposed and the developed conditions. In such a case, how the film should be treated thereafter cannot be determined. Moreover, there is a possibility that the bar code 17 is stopped at a position indicating that the film is unexposed. If the film is loaded in another camera when it is actually partly or fully exposed, double exposure will occur.

The processing of step #55 is performed when one of the first and the second sensors is out of order. Although the position where the bar code 17 was stopped cannot be determined in this case, the bar code pattern can correctly be read since the other sensor is in order. Therefore, the bar code 17 can be stopped at the position indicating that the film is fully exposed by detecting an end point of the third zone R3, for example, with the sensor which is in order and by rotating the spool 14 further by an appropriate angle (different depending on which sensor is in order).

Figure 12:
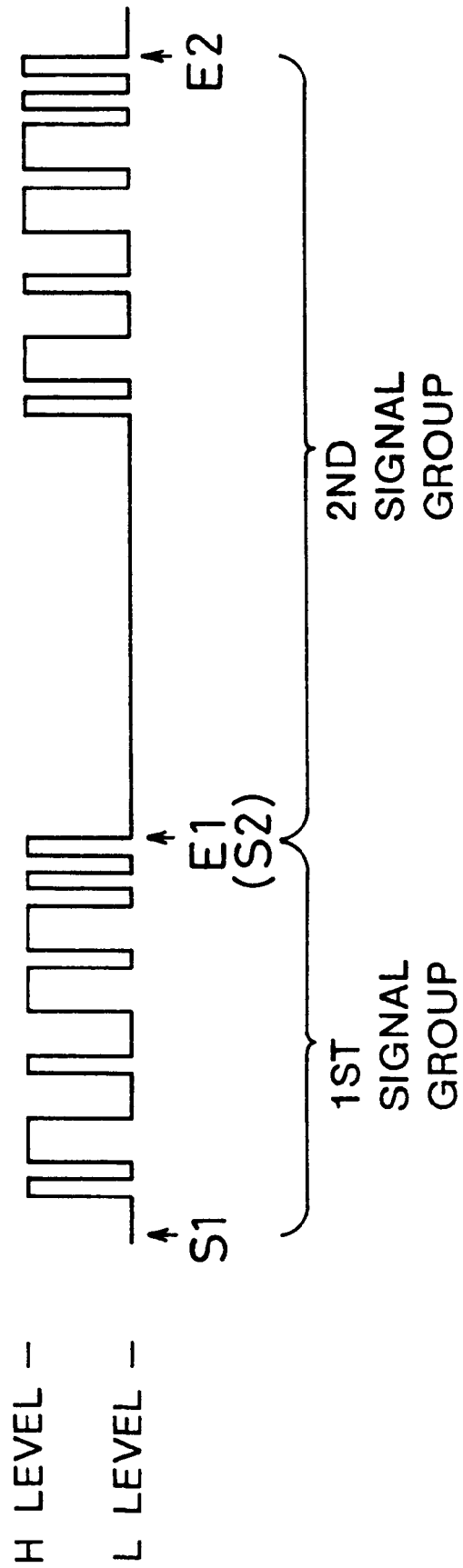
FIG. 12 shows an example of the waveform of output signals of the photoreflectors.

Referring to FIG. 12, there is shown an example of the waveform of the output signals of the second sensor stored in the RAM 66 while the bar code 17 is being read at step #15. This figure corresponds to the bar code shown in FIG. 8 and shows a case where the bar code 17 has been stopped with the point a located opposite the sensor. S1 represents a motor start point, i.e. a bar code reading start point. E1 and E2 represent first and second end points of the last H-level signal of the second zone R2, respectively.

The signals during the period from S1 to E1 are referred to as a first signal group. The signals during the period from E1 to E2 are referred to as a second signal group. The start point and the end point of the first signal group are represented by S1 and E1, respectively. Likewise, the end point of the second signal group is represented by E2. While E1 also represents the start point of the second signal group, the start point of the second signal group is represented by S2 here for convenience. The second signal group corresponds to one rotation of the bar code 17 (in the order of the zones R3, R1 and R2). Since the key 32 of the driver 28 always engages with the key groove 15 of the spool 14 before the point E1, the second signal group has a fixed length and shows a true bar code pattern irrespective of when the engagement occurs.

When the key 32 of the driver 28 engages with the key groove 15 of the spool 14 immediately after the film cartridge 1 is loaded into the cartridge chamber 22, the first signal group also agrees with a part of the bar code pattern as shown in FIG. 12. However, the length of the first signal group varies depending on the position where the bar code 17 was stopped and on when the key 32 engaged with the key groove 15, and is not the same as the length of the second signal group.

Figure 13A:
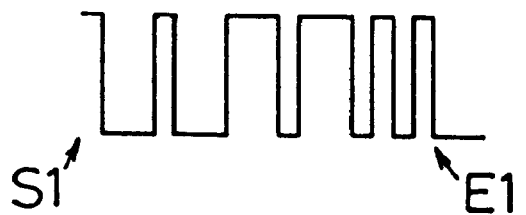
FIGS. 13A to 13G show examples of the waveforms of output signals of the photoreflectors which vary depending on when the driver engages with a film take-up spool.
Figure 13B:
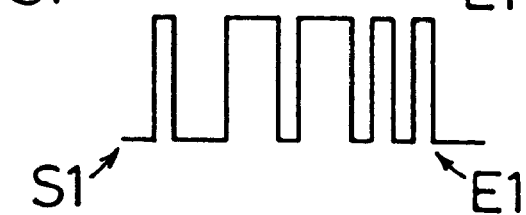
Figure 13C:
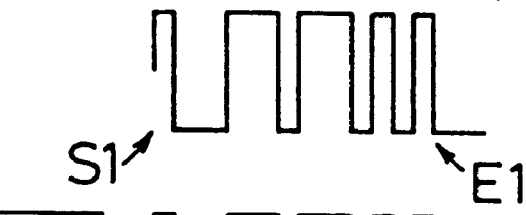

The first signal group will be described in detail with reference to FIGS. 13A to 13G. These figures show the first signal group in the case where the points d, b and e in the fully exposed range F-EXP of FIG. 8 are located opposite the second sensor when the film cartridge 1 is loaded in the camera. FIGS. 13A, 13B and 13C respectively show a case where the points d, b and e are located opposite the second sensor and the key 32 engages with the key groove 15 concurrently with the loading of the film cartridge 1. In FIG. 13A, the signal level at the motor start point S1 is the H level corresponding to white areas of the pattern. In FIG. 13B, the signal level at point S1 is the L level corresponding to black areas of the pattern, and in FIG. 13C, it is the intermediate level between the H and L levels corresponding to the borderline between white and black areas. The lengths of the first signal group, i.e. the periods from S1 to E1 correspond with the lengths of the bar code pattern read by the sensor.

Figure 13D:
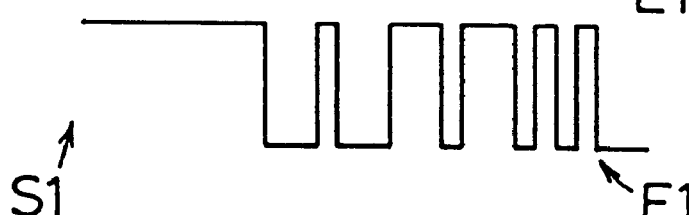
Figure 13E:
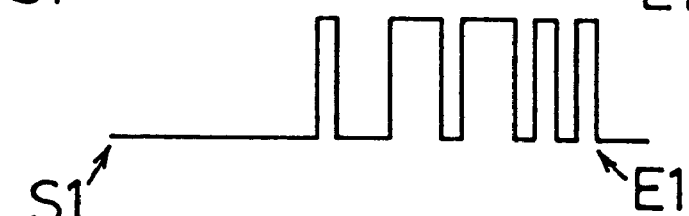

FIGS. 13D and 13E respectively show waveforms when the points d and b are located opposite the second sensor and the key 32 engages with the key groove 15 a while after the start of the motor 64. The H level corresponding to white and the L level corresponding to black appear during the period from the start of the motor 64 to the engagement between the key 32 and the key groove 15 and the waveform agrees with the true bar code pattern thereafter.

Figure 13F:
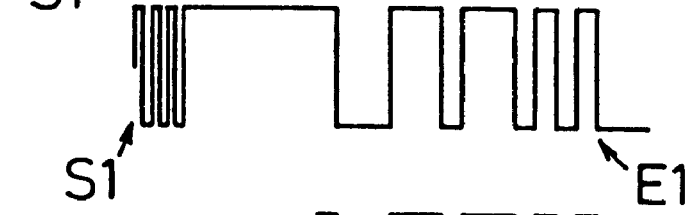
Figure 13G:
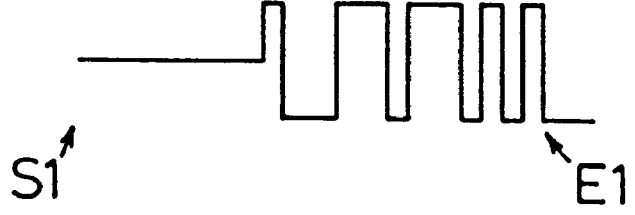

FIGS. 13F and 13G show waveforms when the point e is located opposite the second sensor, the key 32 engages with the key groove 15 a while after the start of the motor 64 and the bar code 17 is stably rotated thereafter. FIG. 13F shows a waveform when the spool 14 shakes immediately after the start of the motor 64 to cause noise. FIG. 13G shows a waveform when the spool 14 does not shake at the start of the motor 64 and the intermediate level between the H and L levels appears.

As shown in FIGS. 13D to 13G, when the key 32 and the key groove 14 are not engaged at the start of the motor 64, a false signal appears before the true signal appears, so that the length of the first signal group increases. However, the length of the true signal in the first signal group indicates the length (angle) from the point of the bar code located opposite the second sensor to the end point of the second zone R2. Therefore, if the length of the true signal is correctly detected, the position where the bar code was stopped is determined based on the length.

The true signal in the first signal group is detected by a comparison with the second signal group which always represents the true signal. The true signal in the first signal group starts at the end point E1 and continues toward the start point S1. Therefore, the first signal group and the second signal group are compared from the end points E1 and E2 to the start points S1 and S2. In this embodiment, the level difference between the signals is obtained for the comparison. This is equivalent to obtaining a difference signal. Comparing the two signals from the end points E1 and E2, the point where the level difference therebetween becomes other than zero is the end point of the false signal, i.e. the start point of the true signal. A length L0 of the true signal is the length from the start point to the end point E1.

As shown in FIG. 8, the bar code stopped position includes the four ranges UNEXP, P-EXP, F-EXP and PROC. The true signal length L0 decreases in this order. That is, the length L0 is longest when the film is unexposed, and shortest when the film is developed. The position where the bar code 17 was stopped is determined by comparing the true signal length L0 with predetermined lengths, i.e. a first predetermined length L1 corresponding to the distance from the end point of the second zone R2 to a point between the developed and the fully exposed ranges PROC and F-EXP, a second predetermined length L2 corresponding to the distance to a point between the fully exposed and the partly exposed ranges F-EXP and P-EXP and a third predetermined length L3 corresponding to the distance to a point between the partly exposed and the unexposed ranges P-EXP and UNEXP.

Note, however, when the bar code 17 was stopped with the partly exposed range P-EXP located opposite the sensor and the angles of the key 32 and the key groove 15 largely differs, the length of the L-level false signal increases, so that the false signal may not be distinguished from the true signal outputted when the bar code 17 was stopped with the unexposed range UNEXP located opposite the sensor. In this case, these signals are distinguished based on the output signal of the first sensor.

As shown in FIG. 8, when the bar code 17 was stopped with the unexposed range UNEXP located opposite the sensor, the pattern of the second zone R2 appears in the output of the first sensor during the L-level period of the first signal group of the second sensor corresponding to the third zone R3. When the bar code 17 was stopped with the partly exposed range P-EXP located opposite the sensor, the pattern of the second zone R2 never appears in the output of the first sensor during this period or even if it appears, it appears only in a last part of the output. Therefore, the last H level of the output signal of the first sensor during this period is found. When there is no H level, it is concluded that the bar code 17 was stopped with the partly exposed range P-EXP located opposite the sensor.

When the H level is found, the output signal of the first sensor is compared with the second signal group of the second sensor from the end point to the start point of the H level. The point where the levels of these signals start to differ is the end point of the false signal of the first sensor output, i.e. the start point of the true signal. The start point of the true signal of the first sensor is also the start point of the true signal of the first signal group of the second sensor. Therefore, which point faced the second sensor when the bar code 17 was stopped is found. The true signal length of the first signal group is obtained in this manner. When the true signal length is equal to or greater than the length corresponding to the distance from the end point of the unexposed range UNEXP to the end point of the second zone R2, the bar code 17 was stopped with the unexposed range UNEXP located opposite the sensor, and in other cases, the bar code 17 was stopped with the partly exposed range P-EXP located opposite the sensor.

Figure 10:
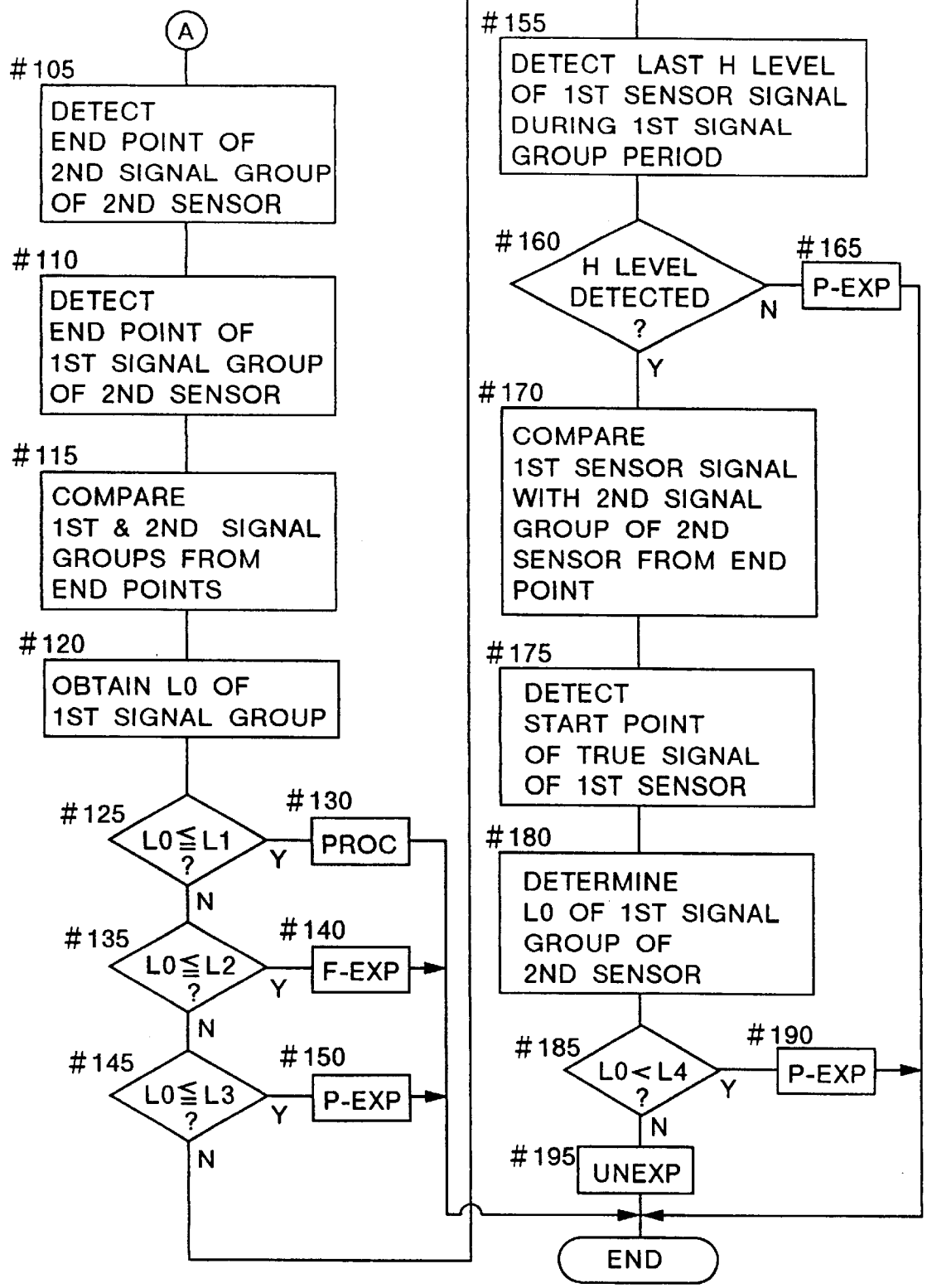
FIG. 10 is a flowchart of a first processing to determine the bar code stopped position.

Referring to FIG. 10, there is shown a flow of a processing according to the determination method described above. This processing is performed upon the neck of the above-described processing of FIG. 9. First, the output signals stored in step #15 are searched for the end point E2 of the second signal group of the second sensor output (step #105), and for the end point E1 of the first signal group (#110). Then, the first signal group and the second signal group are compared from the end points E1 and E2 toward the start points S1 and S2 (#115), so that the start point of the true signal of the first signal group is detected to obtain the length L0 of the true signal of the first signal group (#120).

The predetermined lengths L1, L2 and L3 corresponding to the distance from the end point of the second zone R2 to the point between the developed and the fully exposed ranges PROC and F-EXP, to the distance to the point between the fully exposed and the partly exposed ranges F-EXP and P-EXP and to the distance to the point between the partly exposed and the unexposed ranges P-EXP and UNEXP are calculated in advance and the signal length L0 obtained at step #120 is successively compared with the signal lengths L1, L2 and L3 (steps #125, #135 and #145). When the true signal length L0 is equal to or smaller than the predetermined length L1, it is determined that the developed range PROC was located opposite the sensor (#130). When the true signal length L0 is greater than the predetermined L1 but equal to or smaller than the predetermined length L2, it is determined that the fully exposed range F-EXP was located opposite the sensor (#140). When the true signal length L0 is greater than the predetermined length L2 but equal to or smaller than the predetermined length L3, it is determined that the partly exposed range P-EXP was located opposite the sensor (#150).

When the true signal length L0 is greater than the predetermined length L3, the stored output signals are searched for the last H level of the output of the first sensor corresponding to the period of the first signal group of the second sensor (#155). When no H level is detected (#160), it is determined that the partly exposed range P-EXP was located opposite the sensor (#165). When the H level is detected, the signal of the first sensor from the detected last H level to the start point is compared with the second signal group of the second sensor (#170). In this case, the comparison is also made from the end point toward the start point. By the comparison, the start point of the true signal of the first sensor is detected (#175) and the length from the corresponding point of the first signal group of the second sensor to the end point E1 is determined to be the true signal length L0 of the first signal group (#180).

A predetermined length L4 corresponding to the distance from a point in the unexposed range UNEXP which point is closest to the partly exposed range P-EXP to the end point of the second zone R2 is calculated in advance to compare it with the true signal length L0 (#185). When the true signal length L0 is smaller than the predetermined length L4, it is determined that the partly exposed range P-EXP was located opposite the sensor (#190). When the true signal length L0 is equal to or greater than the predetermined length L4, it is determined that the unexposed range UNEXP was located opposite the sensor (#195).

According to this method, whether the film is unexposed, partly exposed, fully exposed or developed is surely determined.

Figure 11:
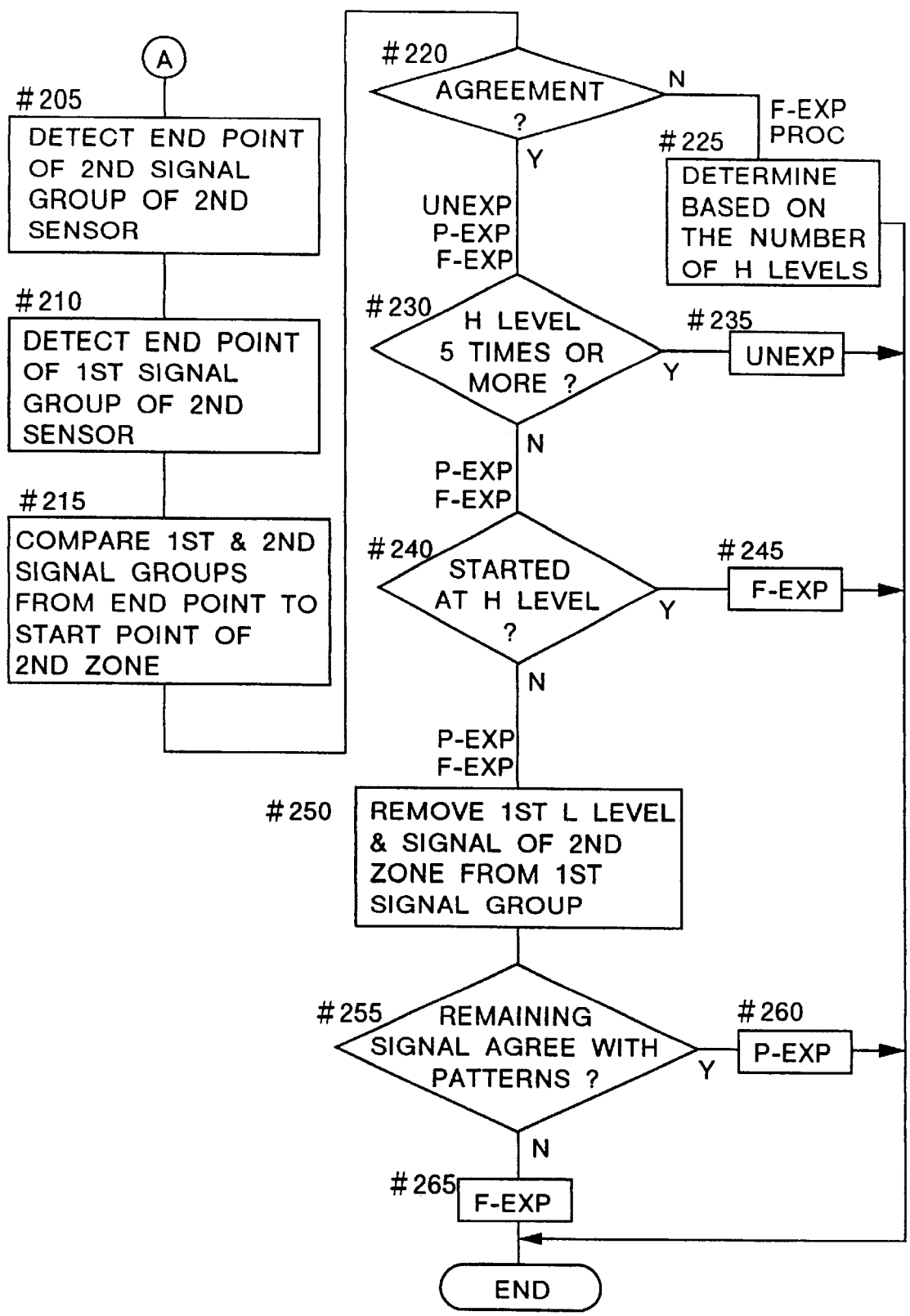
FIG. 11 is a flowchart of a second processing to determine the bar code stopped position.

Instead of using the above-described method, the use condition of the film may be determined by a processing shown in FIG. 11. This is a combination of the method to compare the first and the second signal groups from the end point toward the start point and the method based on the number of signal level variations. First, the stored output signals are searched for the end points E2 and E1 of the second and first signal groups of the second sensor (steps #205 and #210). Then, the signal from the end point E2 of the second signal group to the point corresponding to the start point of the second zone R2 is compared with the signal of the same length from the end point E1 of the first signal group (#215) and whether the signals agree with each other or not is determined (#220).

As shown in FIG. 8, when the developed range PROC and a part of the fully exposed range F-EXP were located opposite the second sensor, the signals do not agree since no complete signal of the second zone R2 is present in the first signal group. In this case, as described above, whether the film is developed or fully exposed is determined based on the number of signal level variations, specifically, on the number of H levels (#225).

The signals compared agree with each other when other part of the fully exposed range F-EXP, the partly exposed range P-EXP and the unexposed range UNEXP were located opposite the sensor. In this case, it is determined whether or not the signal level of the first sensor becomes the H level five times or more during the L-level period of the first signal group (#230). As is apparent from FIG. 8, when the unexposed range UNEXP was located opposite the sensor, the output level of the first sensor becomes the H level five or six times or more during the L-level period of the output of the second sensor. When the partly exposed range P-EXP was located opposite the sensor, the output level of the first sensor may also become the H level. In this case, however, it is not very likely that the H level appears five times or more even though the spool shakes. When the fully exposed range F-EXP was located opposite the sensor, the output level of the first sensor never becomes the H level. Therefore, when the H level appears five times or more at step #230, it is determined that the film is unexposed (#235).

The possible cases left here are the case where the film is partly exposed and the case where the film is fully exposed. When the film is partly exposed, the output of the second sensor always starts at the L level. Therefore, whether the first signal group started at the H level or not is determined (#240). When it started at the H level, it is determined that the film is fully exposed (#245). When it started at the L level, since both of the cases are possible, whether the film is partly exposed or fully exposed is determined based on the signal corresponding to the first zone R1.

The signal corresponding to the second zone R2 and the first L level are removed from the first signal group (#250). The remaining signal completely agrees with the first zone R1 when the film is partly exposed, and does not agree with the first zone R1 when the film is fully exposed. The remaining signal is compared with three predetermined patterns P1 (H-W, L-N, H-N), P2 (H-N, L-W, H-N) and P3 (H-N, L-N, H-W). Here, H and L represent the H level and the L level and W and N represent the wide area and the narrow area. By definition, the first zone R1 cannot take any pattern other than the patterns P1, P2 and P3. For example, the first zone R1 shown in FIG. 8 takes the pattern P3.

The remaining signal is compared with the patterns P1, P2 and P3 (#255). When the remaining signal agrees with one of them, it is determined that the film is partly exposed (#260). When the remaining signal does not agree with any of them, it is determined that the film is fully exposed (#265). With this, the processing to determine the use condition of the film is ended. This determination processing, which is somewhat inferior in correctness to the determination processing of FIG. 10, has an advantage that the processing is completed in a short period of time since fewer signal comparisons are performed.

Instead of providing the three patterns in advance, a signal corresponding to the first zone R1 may be extracted from the second signal group to compare it with the above-described remaining signal. This is because the first signal group and the second signal group are obtained from the same bar code and when the first zone R1 appears in the first signal group, it always appears in the second signal group.

While in the above-described embodiment, an example is described where a bar code radially formed on a disk is read, the application of the code stopped position determination method shown here is not limited to the case where a code recorded on a circular rotation body is read. For example, the method of the invention is applicable to any of the cases where the same code periodically appears such as a case where a bar code is linearly formed on an endless belt along its movement direction. By comparing from the end point a signal which appears after the start of the rotation with a signal of one period which appears when the bar code is rotating at a constant speed, the position of the code when the code was stopped is determined.

Figure 14:
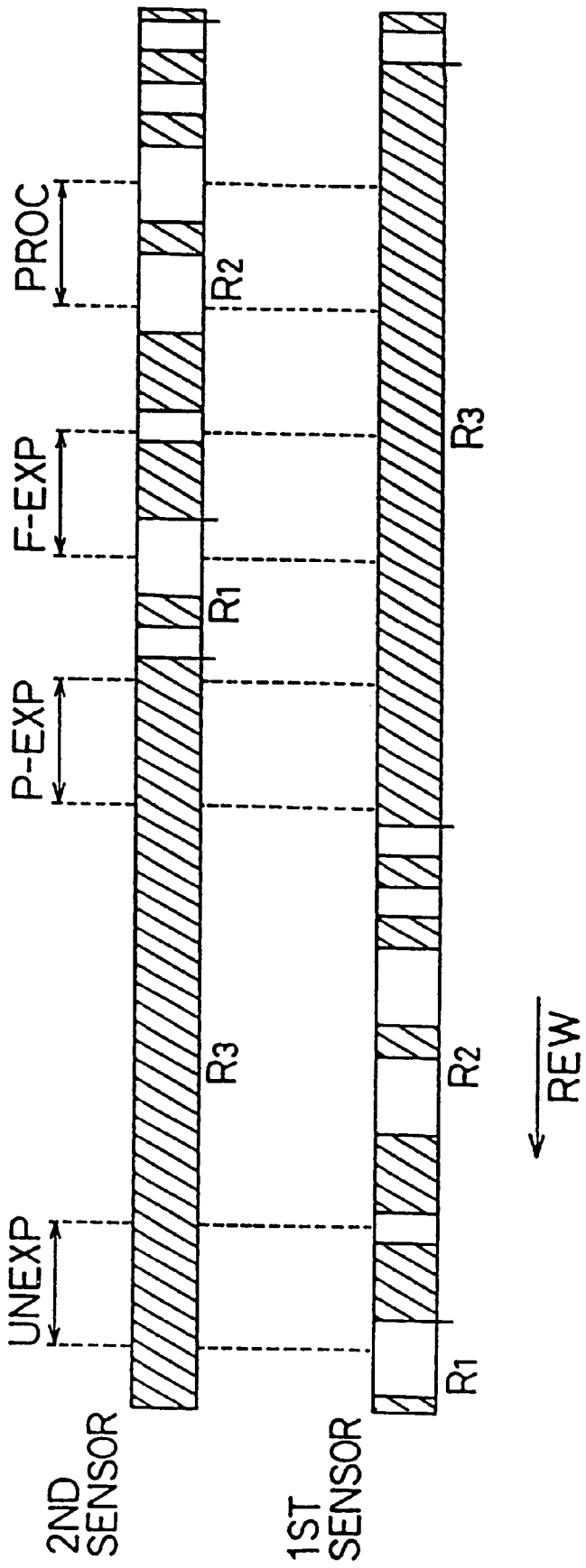
FIG. 14 shows a relationship between the use condition of the film and the bar code stopped position when the positional relationship between the photoreflectors is changed.
Figure 15:
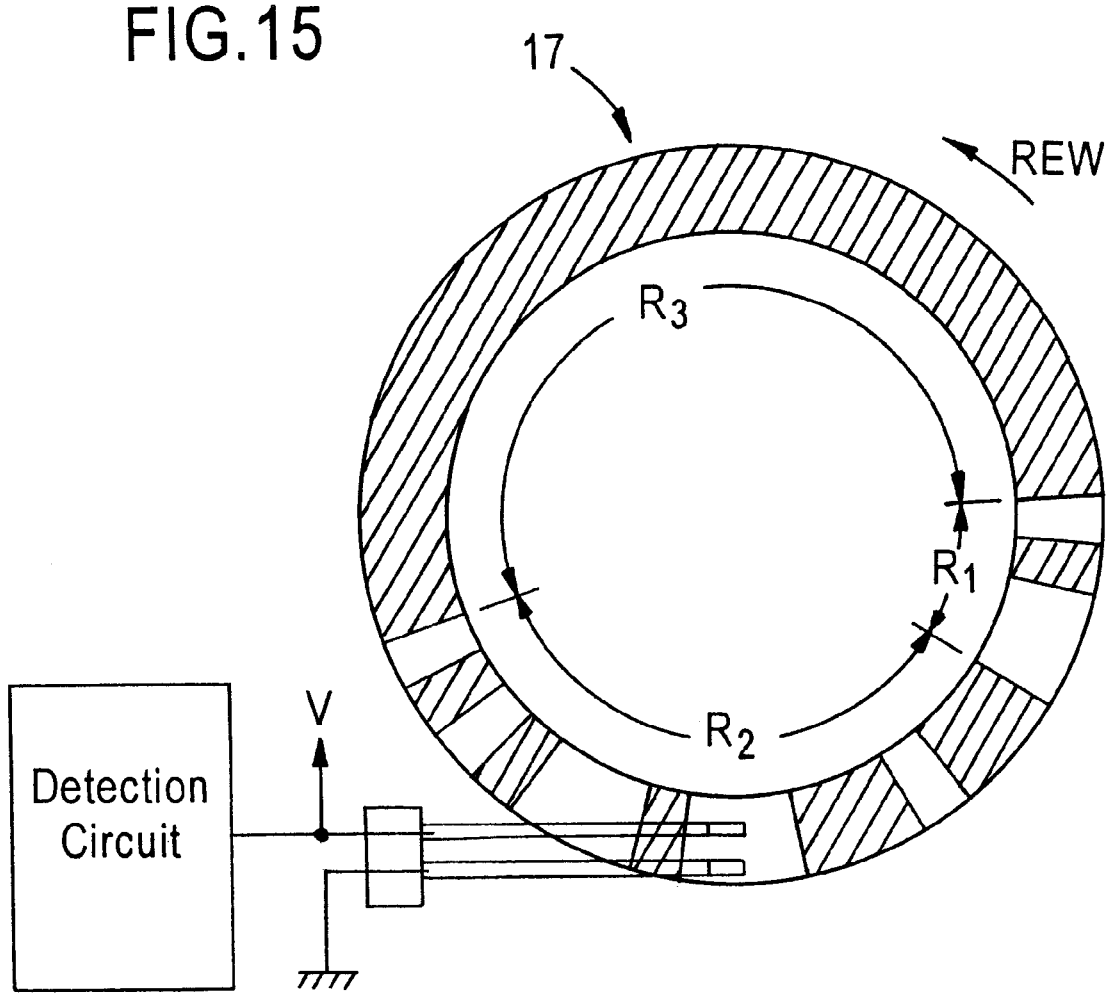
FIG. 15 shows a rotary plate and a monitor kept in contact with the surface of the rotary plate according to an embodiment of the present invention.
Figure 16:
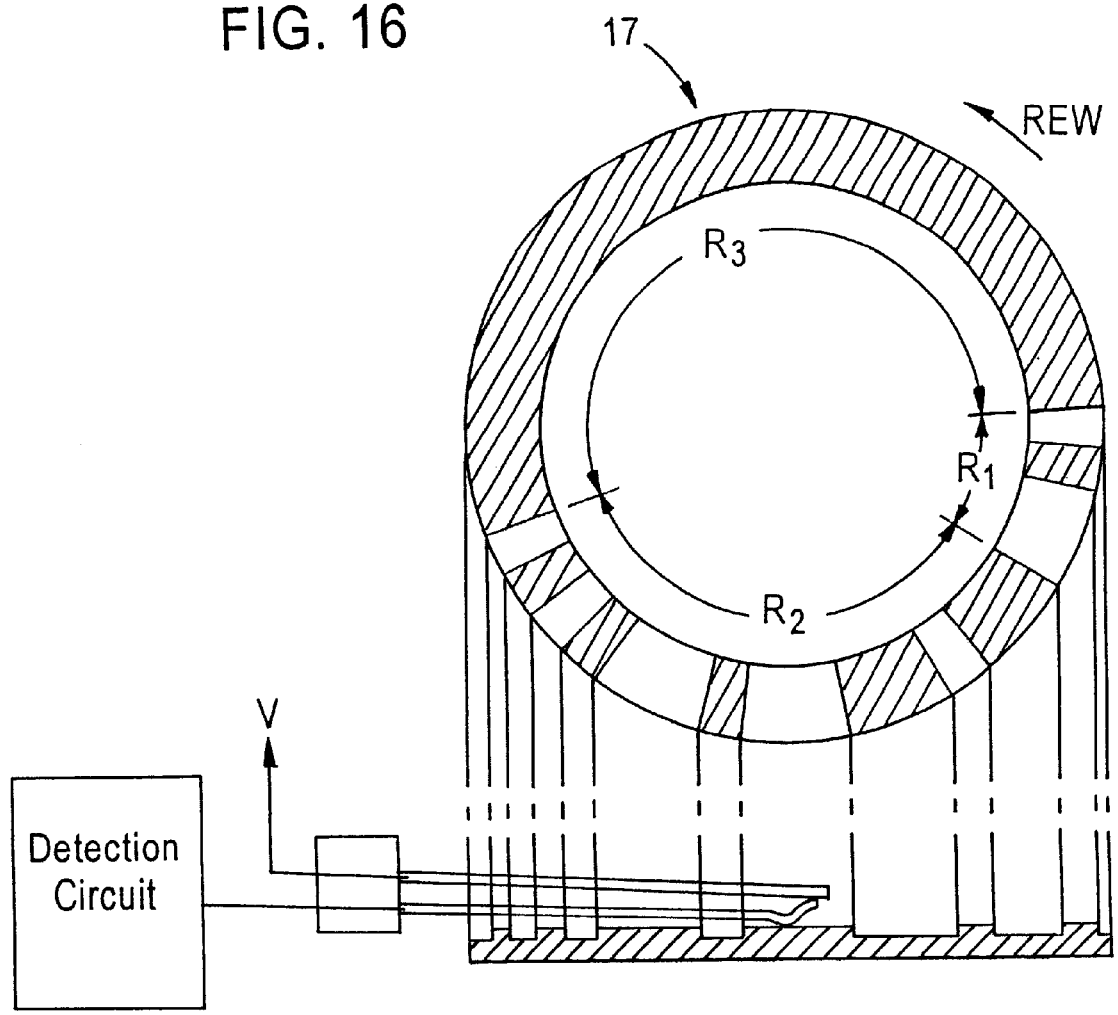
FIG. 16 is a topographical depiction of the rotary plate of FIG. 15 according to an embodiment of the present invention.

In the positional relationship between the first sensor and the second sensor in the above-described embodiment, as shown in FIG. 8, it sometimes occurs that, when the film is partly exposed, the bar code 17 is stopped with a part of the second zone R2 located opposite the first sensor. As shown in FIG. 14, by changing the positional relationship between the first sensor and the second sensor, it is ensured that the bar code 17 is stopped with the first sensor located opposite only the third zone R3 when the film is partly exposed, fully exposed and developed and with the second sensor located opposite the third zone R3 when the film is unexposed.

With such an arrangement, based on which of the first and the second sensors outputs an H-level signal first after the start of the rotation, the unexposed condition and the other partly exposed, fully exposed or developed condition can be surely distinguished from each other without being affected by false signals caused by shakes. That is, when the first sensor outputs the H-level signal first, the film is unexposed, and when the second sensor outputs the H-level signal first, the film is partly exposed, fully exposed, or developed.

In cameras where it is only necessary to distinguish the unexposed condition from other conditions, the object of enabling the determination of the use condition of the film is easily achieved by disposing the first and the second sensors in the positional relationship shown in FIG. 14.

Note that, although the above descriptions deal only with cameras as embodiments, it is also possible to construct devices such as photo-finishing devices and film scanners in similar ways.

Moreover, although the above embodiments use photoreflectors as both the first and second sensors, it is also possible to use electric conductivity sensors, or height sensors.

In the former case, the pattern of the bar code is formed out of conductive and non-conductive segments, and the sensor is realized by use of a pair of electrical contacts. One of the electrical contacts is pulled up by an electric power source and connected to a detecting circuit, whereas the other is grounded. The pair of electrical contacts are disposed in such a way that both make contact with the same segment in the pattern of the bar code (i.e. the two contacts are arranged along a radius). This construction allows the detecting circuit to detect the pulled-up voltage level when the electrical contacts are in contact with a non-conducting segment, and to detect the ground level when they are in contact with a conducting segment.

In the latter case, the pattern of the bar code is formed in such a way that its segments have two different heights with respect to the direction of the spool shaft, that is, the segments are either high or low in that direction. The sensor is realized by use of a pair of electrical contacts. One of the electrical contacts is pulled up by an electric power source, and the other is connected to a detecting circuit. Moreover, of these electrical contacts, one is kept in contact with the pattern of the bar code, whereas the other is held in such a way that, when the former is in contact with a segment having a lower height, the latter is out of contact with the former, and that, when the former is in contact with a segment having a higher height and is therefore bent upward as a result of elastic deformation, the latter is in contact with the former. This construction allows the detecting circuit to detect the pulled-up voltage level when one of the electrical contact is at a segment having a higher height and thus both electrical contacts are in contact with each other, and to detect an open circuit when one of the electrical contact is at a segment having a lower height and thus both electrical contacts are out of contact with each other.

The condition required for dividing into zones the surface of the rotation body used in the present invention is only to provide a zone longer than any other zone. This is a very small limitation. As long as this condition is satisfied, the rotation body stopped position detector of the present invention is capable of detecting the stopped position of the rotation body regardless of how the surface of the rotation body is divided into zones. Therefore, the division of the surface of the rotation body may freely be changed without taking the stopped position detection into account, so that the information represented by the two levels is diversified. The two levels may be set by various methods such as optical methods and electrical methods, and a level setting method and a level detecting means may be selected which are suitable for the field in which the detector is used.

Obviously, many modifications and variations of the present invention are possible in light of the above teachings. It is therefore to be understood that within the scope of the appended claims, the invention may be practiced other than as specifically described.

What is claimed is:

1. An apparatus for handling a mechanism provided with a rotary shaft and
 a rotary plate rotating together with the rotary shaft and having a surface including a first section where a bar code comprising a first state and a second state is formed and a second section which is of the first state and adjacent to the first section, comprising:
  a drive shaft detachably joined to the rotary shaft for driving the rotary shaft to rotate;
  a monitor disposed opposite the surface of the rotary plate for monitoring the state of the surface of the rotary plate;
  a memory for storing signals outputted by the monitor after the drive shaft starts rotating; and
  a detector for detecting an initial rest position of the rotary plate based on the signals stored in the memory,
  wherein the detector recognizes as a first region a group of signals obtained after the drive shaft starts rotating until a result of monitoring by the monitor come to remain in a constant state for a period longer than a predetermined period,
  wherein the detector recognizes as a second region a group of signals obtained after the constant state starts until a result of monitoring by the monitor come to remain in a constant state again for a period longer than the predetermined period,
  wherein the detector detects an initial rest position of the rotary plate by comparing groups of signals of the first and second regions, and
  wherein the detector starts comparing groups of signals of the first and second regions in a reverse chronologically stored order to find a point where a difference occurs between the successive signals of the first and second regions, and discards signals preceding the point in the first region.

2. The apparatus as claimed in claim 1,
 wherein, when a monitored state does not change for a predetermined period after the drive shaft starts rotating, and the monitored state changes after that predetermined period, the detector detects that an initial rest position of the rotary plate was such a position where the second section was opposite the monitor.

3. The apparatus as claimed in claim 1,
 wherein the rotary plate has a surface of first and second levels of reflective index, and the monitor monitors how light is reflected.

4. The apparatus as claimed in claim 1,
 wherein the rotary plate has a surface of first and second levels of electrical conductivity, and the monitor is kept in contact with the surface of the rotary plate to monitor how electricity is conducted.

5. The apparatus as claimed in claim 1,
 wherein the rotary plate has a surface of first and second levels of height, and the monitor monitors a height of the surface.

6. the apparatus as claimed in claim 1,
 wherein the apparatus is a camera.

7. A method of handling a mechanism provided with a rotary plate having a surface including a first section where a bar code comprising a first state and a second state is formed and a second section which is of the first state and adjacent to the first section, comprising:
  a step of starting rotation of the rotary plate;
  a step of monitoring a state of the surface of the rotary plate while being rotated;
  a step of storing signals representative of the state monitored in the monitoring step after the step of starting rotation; and
  a step of detecting an initial rest position of the rotary plate based on the signals stored in the step of storing,
  wherein the step of detecting recognizes as a first region a group of signals obtained after the step of starting rotation until a result of the step of monitoring come to remain in a constant state for a period longer than a predetermined period,
  wherein the step of detecting recognizes as a second region a group of signals obtained after the constant state starts until a result of the step of monitoring come to remain in a constant state again for a period longer than the predetermined period,
  wherein the step of detecting detects an initial rest position of the rotary plate by comparing groups of signals of the first and second regions, and
  wherein the step of detecting starts comparing groups of signals of the first and second regions in a reverse chronologically stored order to find a point where a difference occurs between the successive signals of the first and second regions, and discards signals preceding the point in the first region.

8. The method as claimed in claim 7,
 wherein, when a monitored state does not change for a predetermined period after the step of starting rotation, and the monitored state changes after that predetermined period, the step of detecting detects that an initial rest position of the rotary plate was such a position where the second section was monitored first.

9. The method as claimed in claim 7,
 wherein the rotary plate has a surface of first and second levels of reflective index, and the step of monitoring monitors how light is reflected.

10. An apparatus for handling a mechanism provided with a rotary shaft and a rotary plate rotating together with the rotary shaft and having a surface including a first section, where a bar code is formed by a repetition of a plurality of first state portions and second state portions, and a second section, which is of a constant first state portion larger than the first state portions of the first section, the apparatus comprising:
  a drive shaft detachably joined to the rotary shaft for driving the rotary shaft to rotate;
  a monitor having one or more sensors disposed opposite the surface of the rotary plate for monitoring the state of the surface of the rotary plate;
  a memory for storing signals outputted by the one or more sensors after the drive shaft starts rotating; and
  a detector for detecting an initial rest position of the rotary plate based on signals outputted by a single sensor among the one or more sensors and stored in the memory, wherein the detector recognizes as a first region a group of signals obtained after the drive shaft starts rotating until the second section is found based on signals remaining in a constant state for a period longer than a predetermined period, the detector recognizes as a second region a group of signals obtained after the second section is found until the second section is found again based on signals remaining in a constant state for a period longer than the predetermined period, and the detector detects an initial rest position of the rotary plate by comparing the groups of signals recognized as the first and second regions.

11. An apparatus as claimed in claim 10, wherein the detector starts comparing groups of signals of the first and second regions in a reverse chronologically stored order to find a point where a difference occurs between the signals of the first and second regions, and discards signals preceding the point in the first region.

12. The apparatus as claimed in claim 10, wherein the rotary plate has a surface of first and second levels of reflective index, and the monitor monitors how light is reflected.

13. The apparatus as claimed in claim 10, wherein the rotary plate has a surface of first and second levels of electrical conductivity, and the monitor is kept in contact with the surface of the rotary plate to monitor how electricity is conducted.

14. The apparatus as claimed in claim 10, wherein the apparatus is a camera.

15. An apparatus for handling a mechanism provided with a rotary shaft and a rotary plate rotating together with the rotary shaft and having a surface including a first section where a bar code comprising a first state and a second state is formed and a second section which is of the first state and adjacent to the first section, comprising:

a drive shaft detachably joined to the rotary shaft for driving the rotary shaft to rotate;

a monitor having one sensor disposed opposite the surface of the rotary plate for monitoring the state of the surface of the rotary plate;

a memory for storing signals outputted by the sensor after the drive shaft starts rotating; and a detector for detecting an initial rest position of the rotary plate based on the signals stored in the memory, wherein the detector recognizes as a first region a group of signals obtained after the drive shaft starts rotating until a result of signals outputted by the sensor come to remain in a constant state for a period longer than a predetermined period, the detector recognizes as a second region a group of signals obtained after the constant state starts until a result of signals outputted by the sensor come to remain in a constant state again for a period longer than the predetermined period, the detector detects an initial rest position of the rotary plate by comparing groups of signals outputted by the sensor of the first and second regions, and the rotary plate has a surface of first and second levels of height, and the monitor monitors a height of the surface.

16. A method of handling a mechanism provided with a rotary plate having a surface including a first section, where a bar code is formed by a repetition of a plurality of first state portions and second state portions, and a second section, which is of a constant first stare portion larger than the first state portions of the first section, the method comprising:

step of starting rotation of the rotary plate;

step of monitoring with one or more sensors, a state of the surface of the rotary plate while being rotated;

a step of scoring signals from the one or more sensors outputted after the step of starting rotation; and a step of detecting an initial rest position of the rotary plate based on signals from a single sensor among the one or more sensors stored in the step of storing, wherein the step of detecting recognizes as a first region a group of signals obtained after the step of starting rotation until the second section is found based on signals indicating that the surface of the rotary plate has remained in a constant state for a period longer than a predetermined period, the step of detecting recognizes as a second region a group of signals obtained after the second section is found until the second section is found again based on signals indicating that the surface of the rotary plate has remained in a constant state for a period longer than the predetermined period, and the step of detecting detects an initial rest position of the rotary plate by comparing the groups of signals recognized as the first and second regions.

17. A method as claimed in claim 16, wherein the step of detecting starts comparing groups of signals of the first and second regions in a reverse chronologically stored order to find a point where a difference occurs between the signals of the first and second regions, and discards signals preceding the point in the first region.

18. The method as claimed in claim 16, wherein the rotary plate has a surface of first and second levels of reflective index, and the step of monitoring monitors how light is reflected.

\* \* \* \* \*